United States Patent
Kalampoukas et al.

(10) Patent No.: US 9,942,711 B2
(45) Date of Patent: *Apr. 10, 2018

(54) APPARATUS AND METHOD FOR DETERMINING CO-LOCATION OF SERVICES USING A DEVICE THAT GENERATES AN AUDIO SIGNAL

(71) Applicant: Alphonso Inc., San Carlos, CA (US)

(72) Inventors: Lampros Kalampoukas, Brick, NJ (US); Ashish Chordia, Mountain View, CA (US); Raghu Srinivas Kodige, San Carlos, CA (US)

(73) Assignee: Alphonso Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/583,581

(22) Filed: May 1, 2017

(65) Prior Publication Data

US 2017/0303086 A1 Oct. 19, 2017

Related U.S. Application Data

(63) Continuation of application No. 15/224,108, filed on Jul. 29, 2016, now Pat. No. 9,641,980, which is a
(Continued)

(51) Int. Cl.
*H04W 4/02* (2018.01)
*G10L 19/018* (2013.01)
*G06F 17/30* (2006.01)

(52) U.S. Cl.
CPC ...... *H04W 4/023* (2013.01); *G06F 17/30743* (2013.01); *G10L 19/018* (2013.01); *H04W 4/021* (2013.01)

(58) Field of Classification Search
None
See application file for complete search history.

(56) References Cited

U.S. PATENT DOCUMENTS

| | | | |
|---|---|---|---|
| 4,677,466 A | 6/1987 | Lert, Jr. et al. | |
| 4,697,209 A | 9/1987 | Kiewit et al. | |

(Continued)

FOREIGN PATENT DOCUMENTS

| | | |
|---|---|---|
| EP | 2501144 A2 | 9/2012 |
| EP | 2501145 A2 | 9/2012 |
| EP | 2501146 A2 | 9/2012 |

OTHER PUBLICATIONS

Apple iPhone 3G Full Phone Specification, 2008, downloaded from web page: http://www.gsmarena.com/appleiphone.com, Downloaded date: Nov. 19, 2015, original posting date: unknown, 2 pages.

(Continued)

*Primary Examiner* — Paul Huber
(74) *Attorney, Agent, or Firm* — Panitch Schwarze Belisario & Nadel LLP

(57) ABSTRACT

Methods and apparatus are provided for generating an audio signature. An audio signal generator generates an audio signal. A speaker responsive to the audio signal generator outputs the generated audio signal. A probe including a microphone samples the generated audio signal detected by the microphone. An audio signature generator is connected to the probe and generates an audio signature from the sampled audio signal detected by the microphone. The audio signature generator generates the audio signature without requiring detection of any additional audio signal. A transmitter connected to the audio signature generator transmits the audio signature to a communications channel.

28 Claims, 6 Drawing Sheets

Related U.S. Application Data continuation of application No. 14/713,928, filed on May 15, 2015, now Pat. No. 9,583,121.

(60) Provisional application No. 61/994,634, filed on May 16, 2014, provisional application No. 61/994,799, filed on May 16, 2014, provisional application No. 61/994,812, filed on May 16, 2014, provisional application No. 61/994,810, filed on May 16, 2014, provisional application No. 61/994,805, filed on May 16, 2014.

(56) References Cited

U.S. PATENT DOCUMENTS

| | | | |
|---|---|---|---|
| 5,351,075 | A | 9/1994 | Herz et al. |
| 5,659,653 | A | 8/1997 | Diehl et al. |
| 5,802,488 | A | 9/1998 | Edatsune |
| 6,771,885 | B1 | 8/2004 | Agnihotri et al. |
| 6,856,758 | B2 | 2/2005 | Iggulden |
| 7,003,213 | B1 | 2/2006 | Hasegawa |
| 7,013,301 | B2 | 3/2006 | Holm et al. |
| 7,443,807 | B2 | 10/2008 | Cutler |
| 7,451,085 | B2 | 11/2008 | Rose et al. |
| 7,565,104 | B1 | 7/2009 | Brown et al. |
| 8,280,772 | B2 | 10/2012 | Fish |
| 8,452,604 | B2 | 5/2013 | Tischer |
| 8,453,170 | B2 | 5/2013 | Briggs et al. |
| 8,468,357 | B2 | 6/2013 | Roberts et al. |
| 8,561,081 | B1 | 10/2013 | Richards et al. |
| RE45,289 | E | 12/2014 | Goldberg et al. |
| 8,948,895 | B2 | 2/2015 | Weiss et al. |
| 9,094,453 | B2 | 7/2015 | Ady et al. |
| 9,306,689 | B2 | 4/2016 | Weiss et al. |
| 9,332,522 | B2 | 5/2016 | Corbellini et al. |
| 2002/0072982 | A1 | 6/2002 | Barton et al. |
| 2002/0083060 | A1 | 6/2002 | Wang et al. |
| 2002/0099555 | A1 | 7/2002 | Pitman et al. |
| 2003/0039464 | A1 | 2/2003 | Davis et al. |
| 2003/0086341 | A1 | 5/2003 | Wells et al. |
| 2003/0088871 | A1 | 5/2003 | Kimura |
| 2004/0257196 | A1 | 12/2004 | Kotzin |
| 2005/0004797 | A1 | 1/2005 | Azencott |
| 2005/0208913 | A1 | 9/2005 | Raisinghani et al. |
| 2006/0064721 | A1 | 3/2006 | Del Val et al. |
| 2007/0050832 | A1 | 3/2007 | Wright et al. |
| 2007/0143777 | A1 | 6/2007 | Wang |
| 2007/0183415 | A1 | 8/2007 | Fischer et al. |
| 2007/0183743 | A1 | 8/2007 | Tanikawa et al. |
| 2010/0142715 | A1 | 6/2010 | Goldstein et al. |
| 2010/0226526 | A1 | 9/2010 | Modro et al. |
| 2010/0238304 | A1 | 9/2010 | Miyata |
| 2011/0022633 | A1 | 1/2011 | Bernosky et al. |
| 2011/0055136 | A1 | 3/2011 | Hamilton, II et al. |
| 2011/0085781 | A1 | 4/2011 | Olson |
| 2011/0087490 | A1 | 4/2011 | Olson |
| 2011/0161419 | A1 | 6/2011 | Chunilal |
| 2011/0289114 | A1 | 11/2011 | Yu et al. |
| 2011/0320202 | A1 | 12/2011 | Kaufman |
| 2012/0029670 | A1 | 2/2012 | Mont-Reynaud et al. |
| 2012/0059495 | A1 | 3/2012 | Weiss et al. |
| 2012/0184372 | A1 | 7/2012 | Laarakkers et al. |
| 2012/0224711 | A1 | 9/2012 | Kim et al. |
| 2012/0265328 | A1 | 10/2012 | Kadirkamanathan et al. |
| 2012/0293329 | A1 | 11/2012 | Cunningham et al. |
| 2012/0315014 | A1 | 12/2012 | Shuster |
| 2013/0046542 | A1 | 2/2013 | Papakipos et al. |
| 2013/0071090 | A1 | 3/2013 | Berkowitz et al. |
| 2013/0103810 | A1 | 4/2013 | Papakipos et al. |
| 2013/0139209 | A1 | 5/2013 | Urrabazo et al. |
| 2013/0197902 | A1 | 8/2013 | Nazarian |
| 2013/0202128 | A1 | 8/2013 | Jain et al. |
| 2013/0205318 | A1 | 8/2013 | Sinha et al. |
| 2013/0245986 | A1 | 9/2013 | Grokop et al. |
| 2013/0290502 | A1 | 10/2013 | Bilobrov et al. |
| 2013/0301706 | A1 | 11/2013 | Qiu et al. |
| 2013/0316679 | A1 | 11/2013 | Miller et al. |
| 2013/0319251 | A1 | 12/2013 | Cheung |
| 2013/0339019 | A1 | 12/2013 | Giancarlo et al. |
| 2014/0046922 | A1 | 2/2014 | Crook et al. |
| 2014/0249771 | A1 | 9/2014 | Yang et al. |
| 2014/0254801 | A1 | 9/2014 | Srinivasan et al. |
| 2014/0278389 | A1 | 9/2014 | Zurek et al. |
| 2014/0282660 | A1 | 9/2014 | Oztaskent et al. |
| 2014/0334644 | A1 | 11/2014 | Selig et al. |
| 2015/0006167 | A1 | 1/2015 | Kato et al. |
| 2015/0104023 | A1 | 4/2015 | Bilobrov |
| 2015/0194152 | A1 | 7/2015 | Katuri et al. |
| 2015/0279381 | A1 | 10/2015 | Goesnar et al. |
| 2015/0296170 | A1 | 10/2015 | Farrell et al. |
| 2015/0331660 | A1 | 11/2015 | Kalampoukas et al. |
| 2015/0331661 | A1 | 11/2015 | Kalampoukas et al. |
| 2015/0332669 | A1 | 11/2015 | Kalampoukas et al. |
| 2015/0332687 | A1 | 11/2015 | Kalampoukas et al. |
| 2016/0179466 | A1 | 6/2016 | Weiss et al. |
| 2016/0316293 | A1 | 10/2016 | Klimanis |
| 2016/0336025 | A1 | 11/2016 | Kalampoukas et al. |

OTHER PUBLICATIONS

Zhao et al, "Audio Recording Location Identification Using Acoustic Environment Signature," IEEE Trans. Information Forensics and Security, vol. 8, No. 11, pp. 1746-1759, Nov. 2013.

Principles of Motion Sensing, Wayback Machine, Wikipedia, Sep. 6, 2013,, downloaded from web page:https://en.wikipedia.org/wiki/PrinciplesofMotionSensing, DOwnload date: Nov. 19, 2015, original posting date unknown, 3 pgs.

Cano et al., "A Review of Algorithms for Audio Fingerprinting", IEEE Workshop on Multimedia Signal Processing, pp. 169-173, Nov. 11, 2002.

Burges et al., Name That Tune: Stream Audio Fingerprinting, Microsoft Research, http://research.microsoft.com/en-us/um/people/cburges/rare.htm, Download date: Jul. 14, 2016, original posting date unknown, 37 pages.

iOS 7: Understanding Location Services, downloaded from web page: http://support.apple.com/en-us/HT201357, Dowloaded date: 2015, original posting date unknown, 4 pages.

Baluja et al., "Content Fingerprinting Using Wavelets", Google, Inc., 3rd European Conference on Visual Media Production, pp. 198-207, 2006.

Baluja et al., "Permutation Grouping: Intelligent Hash Function Design for Audio & Image Retrieval", Google, Inc., IEEE International Conference on Acoustics, Speech and Signal Processing, pp. 2137-2140, 2008.

Wang, "An Industrial-Strength Audio Search Algorithm", Shazam Entertainment, Ltd., ISMIR 2003, 4th International Conference on Music Information Retrieval, 7 pgs, 2003.

Haitsma et al., "A Highly Robust Audio Fingerprinting System", Journal of New Music Research, pp. 211-221,2003.

Kekre et al., "A Review of Audio Fingerprinting and Comparison of Algorithms", International Journal of Computer Applications IJCA, vol. 70, No. 13, pp. 24-30, May 2013.

Android Sensors Overview, Mar. 9, 2014, downloaded from web page: http://developer.android .com/guide/topics/sensors/sensor_overview.html, Downloaded date: Jul. 15, 2015, original posting date: unknown, 13 pages.

Office Action dated Oct. 18, 2016 in U.S. Appl. No. 15/224,108, by Kalampoukas.

Office Action dated Sep. 29, 2016 in U.S. Appl. No. 14/713,928 by Kalampoukas.

USER DEVICE

APPARATUS AND METHOD FOR DETERMINING CO-LOCATION OF SERVICES USING A DEVICE THAT GENERATES AN AUDIO SIGNAL

CROSS REFERENCE TO RELATED APPLICATIONS

This application is a continuation of U.S. patent application Ser. No. 15/224,108 filed Jul. 29, 2016, which in turn is a continuation of U.S. patent application Ser. No. 14/713, 928 filed May 5, 2015, now U.S. Pat. No. 9,583,121, the entire contents of which are both incorporated by reference.

This application claims priority under 35 U.S.C. § 119(e) to U.S. Provisional Application Ser. Nos. 61/994,799, 61/994,634, 61/994,805, 61/994,810 and 61/994,812, all filed on May 16, 2014, the entire contents of which are incorporated by reference.

BACKGROUND OF THE INVENTION

1. Field of the Invention

The invention relates to a method of determining co-location of devices using audio information, and particularly a method which relies on identification of unique or matching audio signatures to identify co-located devices.

2. Description of the Related Technology

EP 2 501 145 A2 entitled, "Content Provision," is expressly incorporated by reference herein and shows an application where it is useful to identify the audio or video content being presented to a user.

U.S. 20130205318 A1 entitled, "Method and system for automatic content recognition based on customized user preferences," is expressly incorporated by reference herein and shows an automatic content recognition (ACR)-enabled connected TV device may be operable to identify, utilizing an ACR system, content in a presented program.

U.S. 20130071090 A1 entitled, "Automatic content recognition system and method for providing supplementary content," is expressly incorporated by reference herein and shows automatic content recognition performed to determine the primary digital content. The time of a sample may also be determined. Supplementary digital content is then selected and transmitted to the media device, or to another device, based upon the identified primary digital content. The supplementary digital content may be adapted in layout, type, length, or other manners, based upon the platform and/or configuration of the media device or any other device to which the supplementary digital content is transmitted.

U.S. 20110289114 A1 entitled "System and method for auto content recognition," is expressly incorporated by reference herein and shows automatically recognizing media contents by the steps of capturing media content from the Internet and/or devices, extracting fingerprints from captured content and transferring to backend servers for identification, and backend servers processing the fingerprints and replying with identified result.

SUMMARY OF THE INVENTION

According to an advantageous feature of the invention an audio signature may be used to characterize the audio at a location for automatic content recognition.

An Audio Signature is a digital summary, generated from an audio signal, which can be used to identify an audio sample or quickly locate similar items in a database.

An Audio Fingerprint is a condensed digital summary, generated from an audio signal, which can be used to identify an audio sample or quickly locate similar items in an audio database. As used herein, a fingerprint is a special form of a signature.

Automatic content recognition (ACR) refers to the ability to identify a content element within the proximity of a probe or sensor, audio, video or image, based on sampling a portion of the audio, or video, or image, processing the sample and comparing it with a reference.

User devices include audio detection components, such as microphones, may be portable. It is an object of the invention to determine when such devices are co-located.

It is an object of the invention to facilitate determining co-location of user devices.

Co-location means sufficiently close in proximity so as to be considered to be together, in light of the purpose of an inquiry. Variations in sampling devices and acoustical differences even in very close together locations will cause differences in audio signatures generated by different devices. The process of comparison of audio signatures is not intended to identify an exact match. Digital representations of signatures which match within a tolerance may be considered to be co-located. An empirical study may be used to determine the tolerance by experimental readings under various conditions, distances and devices how much tolerance will be permitted in the comparisons to justify an inference of co-location.

An apparatus for determining co-location of devices may include a receiver connected to one or more communication channels configured or programmed to receive a remote audio signature and a remote device identification over a communication channel and a database. One or more remote audio signatures may be stored in the database. A remote device identification may be associated with an audio signature stored in the database. A query engine may be connected to the database configured or programmed to compare a remote audio signature stored in the database to a remote audio signature received over the communication channel The apparatus may include a processor responsive to the query engine configured or programmed to report a remote device identification associated with one of the audio signatures when an audio signature received over the communication channel matches an audio signature stored in the database within a threshold confidence level. The processor may be configured or programmed to report a remote device identification associated with an audio signature received over the communication channel and a remote device identification associated with an audio signature stored in the database when the audio signatures match within a threshold confidence level.

A component of the audio signature may represent a remote device identification. The query engine may be configured or programmed to limit a query set of the database according to a specified parameter. The specified parameter may be a temporal parameter. The specified parameter may be based on location services. The specified parameter may require temporal and location services based proximity of the audio signature received over the communication channel and the audio signature stored in the database.

A database controller may be configured or programmed to remove expired audio signatures from a comparison set. A database controller may be configured or programmed to limit matching queries to no more than a preset number of stored audio signatures. A database controller may be configured or programmed to delete audio signatures in the database after a predetermined time period.

A method for determining co-location of devices may include the steps of receiving a remote audio signature and remote device identification over the communication channel, comparing a remote audio signature stored in the database to a remote audio signature received over the communication channel, and reporting a remote device identification associated with one of the audio signatures when an audio signature received over the communication channel matches an audio signature stored in the database within a threshold confidence level.

The method may include the step of reporting a remote device identification associated with an audio signature received over the communication channel and a remote device identification associated with an audio signature stored in the database when the audio signatures match within a threshold confidence level. A component of the audio signature may represent a remote device identification. The method may include the step of limiting a query set of the database according to a specified parameter. The specified parameter may be a temporal parameter. The specified parameter may be based on location services. The specified parameter may require temporal and location services based proximity of the audio signature received over the communication channel and the audio signature stored in the database. The method may include the step of removing expired audio signatures from a comparison set. The method may include the step of limiting matching queries to no more than a preset number of stored audio signatures. The method may include the step of deleting audio signatures in the database after a predetermined time period.

An apparatus for generating an audio signature may include a processor, a microphone connected to the processor, an audio signal generator connected to the processor and configured or programmed to generate an audio signal indicative of the apparatus, a speaker responsive to the audio signal generator, an audio signature generator connected to the processor and responsive to the microphone, and a transmitter connected to the processor capable of transmitting an audio signature to a communications channel.

The audio signal generator may be configured or programmed to generate an inaudible audio signal. The audio signal generator may be an audio identification signal generator.

A method for generating an audio signature may include the steps of generating an audio signal indicative of a user device, outputting the audio signal indicative of a user device through a speaker, using a microphone to sense audio, generating an audio signature of the audio sensed by the microphone, and transmitting the audio signature to a communication channel. The step of generating may generate an inaudible audio signal. The step of generating may generate an inaudible audio signal which may be an audio identification signal.

The invention may include an article of manufacture, a method, a system, and an apparatus for determining co-location of user devices.

The article of manufacture of the invention may include a computer-readable medium comprising software for a system for determining co-location of user devices, using automatic content recognition.

The article of manufacture of the invention may include a computer-readable medium comprising software for an automatic content recognition system, comprising code segments for generating audio signatures and storing them with time stamps.

The article of manufacture of the invention may include a computer-readable medium comprising software for an automatic content recognition system, comprising code segments for comparing generated audio signatures to reference signatures for identification and determining co-location of user devices.

The system of the invention may include a computer system including a computer-readable medium having software to operate a computer or other device in accordance with the invention.

The apparatus of the invention may include a computer including a computer-readable medium having software to operate the computer in accordance with the invention.

The article of manufacture of the invention may include a computer-readable medium having software to operate a computer in accordance with the invention.

Various objects, features, aspects, and advantages of the present invention will become more apparent from the following detailed description of preferred embodiments of the invention, along with the accompanying drawings in which like numerals represent like components.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

DETAILED DESCRIPTION OF THE PREFERRED EMBODIMENT

Figure 1:
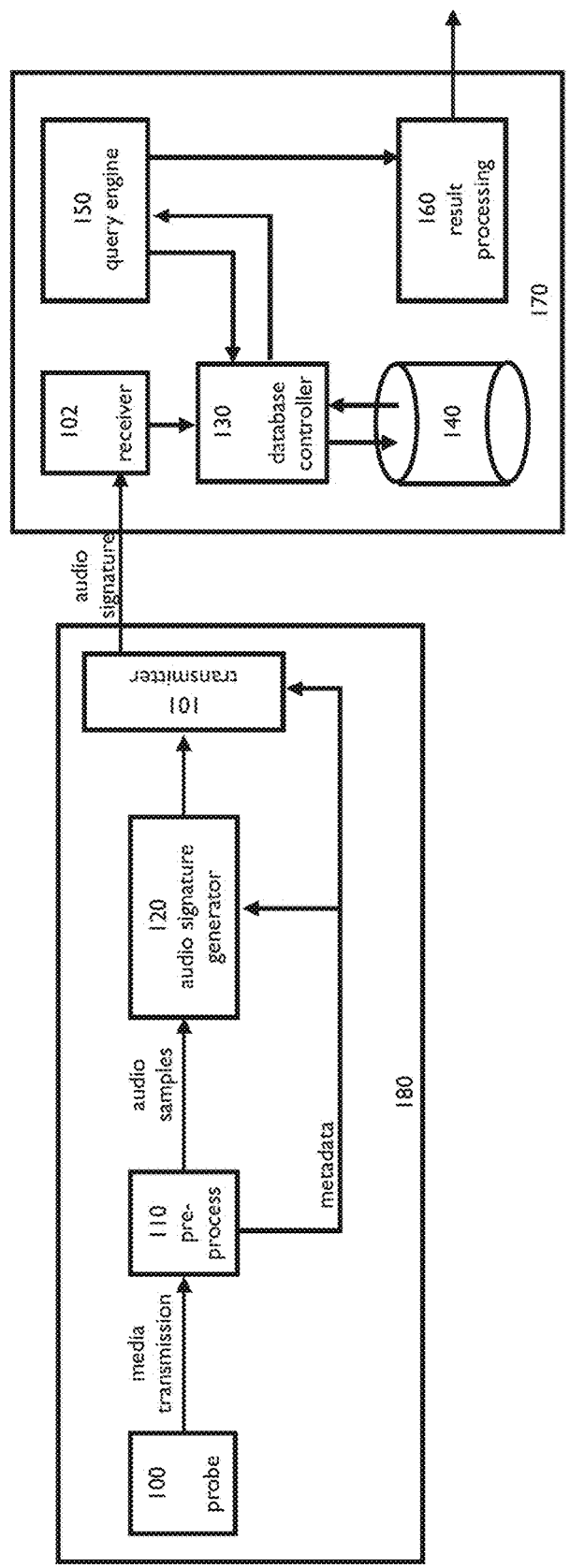
FIG. 1 shows a schematic of a system for automatic content recognition.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

The system may rely on automatic content recognition technology. One example of the use of automatic content recognition technology is the identification of audio. Automatic content recognition technology can be used to identify cable or network broadcast content. The shows may include portions which are the episodes, referred to as principle content, and supplemental content such as commercials, emergency alerts and/or news interruptions. The content may be audio and visual, visual only, or audio only. The embodiments of the invention are described in terms of using audio as a representation of audio visual content, but the invention is equally applicable to audio only content. Furthermore the embodiments of the invention are described in the context of sampling audio and generating audio signatures or fingerprints, but is equally applicable to sampling visual content, including video or images, and generating signatures or fingerprints based on the visual samples.

According to an advantageous feature of the invention, automatic content recognition may be utilized to compare audio sampled by one remote user device to audio sampled by another remote user device. Comparisons that match with a sufficient level of confidence may permit a conclusion that the remote user devices are co-located.

FIG. 1 shows a schematic of a system for automatic content recognition. FIG. 1 shows a remote user device 180 which may be associated with an individual or a location. The remote user device 180 may be a device used to collect or process audio information. The remote user device 180 may be a smart phone, tablet or other device.

FIG. 1 shows a remote user device 180 having a probe 100 which may be used to collect information for use in automatic content recognition. The information may include audio information and other information that is metadata related to the collected audio or associated with the remote user device or user. The probe may comprise more than one component depending on what components would be useful to collect the information. The probe may include a microphone, clock or time stamp generator, camera, GPS sensor or other elements for location services or temperature sensor and may have access to other device information such as user identification, serial number and MAC address, and time.

According to a preferred embodiment, the probe may be embodied in a smartphone or tablet or a smart glass (like google glass) or a smart watch or a wearable device which may be associated with a user. Other devices embodying a probe may include, notebooks, desktop computers, dedicated devices or set-top boxes which have a microphone and/or camera to collect audio and/or video information. The probe may utilize an internal clock or a network accessible clock to generate a time stamp. Smartphone devices provide ready access to location services and other parameters which are known or derived by the probe device or accessed over a communications channel. Apple Support Note HT5594, the content of which is incorporated herein, accessible at http://support.apple.com/kbHT5594, describes location services available to an iOS device.

The information may be processed in order to format and segregate the information. Formatted data representative of an audio or video presentation may be processed by pre-processor 110. The pre-processor advantageously is running on the same device as the probe and may be in the form of an app on a smartphone or tablet. The pre-processor may be a component of an app running on a user's smartphone or tablet. For example, the pre-processor may control audio sampling to collect digital information representative of audio.

The remote user device may capture audio information using a component to "listen" to audio being played or present in the location of the remote user device 180. According to an advantageous feature, capturing may be accomplished by audio sampling. The audio samples may be transmitted to a server as captured, or a signature may be generated which may then be transmitted to a server location. The signature may be an audio fingerprint and may include metadata.

The remote user device need not be in the same location as a server. The remote device 180 may be a cellphone or a tablet device or a wearable device. Smartphones such as an iPhone or Android-based device may serve as the remote user device 180. Some remote user devices may be stationed at a location. The stationed remote user devices may be implemented in or combined with a set-top box, media server, and home computer or DVD/Blu-ray player.

The server may operate to correlate the audio information received from a remote user device and reference information stored in a database to identify or characterize the audio information. In particular, an audio signature received from a remote user device may be compared to signatures previously stored in a database. A signature match within an acceptable tolerance may indicate co-location of remote user devices corresponding to matched audio signatures. The audio signatures from the remote user device may be stored in the database to compare to audio signatures received from other remote user devices. The reference may include audio signatures or audio fingerprints and metadata for one or more streams of audio and/or visual programming, and may include identification of content and content class, such as principle content or supplemental content.

This information may be useful for many purposes including, without limitation, to associate devices in a household, to feed supplemental media to a user or user device, to price audio content delivery, for analytic or other purposes. A correlation may be used to infer that two or more remote audio devices are co-located.

FIG. 1 shows a diagram of an automatic content recognition ("ACR") system. Automatic content recognition can be used in many applications where it is desirable to identify audio information.

The pre-processor may pass the formatted audio samples to an audio signature generation unit. There are a number of ways to generate an audio signature. For example, U.S. Pat. No. 8,468,357 entitled, "Multiple Step Identification of Recordings" is expressly incorporated herein by reference. U.S. Pat. No. 8,468,357 discloses a method and system where algorithmically-determined fingerprints are extracted from audio information utilizing one or more fingerprint extraction methods. An audio fingerprint may be used as an audio signature. The fingerprint may be less unique than an uncompressed signature, but has the benefit of conserving transmission bandwidth and computational resources used for comparison to a reference data-set.

U.S. Pat. No. 8,453,170 B2 entitled, "System and method for monitoring and recognizing broadcast data," is expressly incorporated by reference herein and shows an automatic content recognition (ACR) system.

The audio signature generator 120 may be advantageously executed on the same device as the probe 100 and the pre-processor 110. Advantageously that device is a user's cellphone, smartphone, or tablet. The audio signature created by audio signature generator 120 and the metadata segregated by pre-processor 110, if any, may be combined and transmitted by transmitter 101 to a server 170. A time stamp may be associated with the audio signature by the remote user device 180. Alternatively, a times stamp may be associated with an audio signature by the server 170 upon receipt of the signature.

The server may include a receiver 102 receive an audio signature and a database controller 130. The receiver receives audio signatures and any metadata associated with the audio signatures that is transmitted by a remote user device 180. The receiver 102 may associate a time stamp with an audio signature. The database controller 130 may advantageously format the audio signature and associated metadata, if any, for storage in a database 140. The database controller 130 may also inform a query engine 150 of the signature or the signature received from a user device 180 ("query audio signature") and metadata. The query engine 150 can advantageously access the database 140 in order to find reference signature(s) corresponding to the query audio signature from a remote user device 180 which resulted in the signature. When an audio signature is matched, some or all of the metadata and or audio signature may be passed to a result processing module 160 which is able to make use of the identification of a match and the metadata associated with the query audio signature and/or associated with the reference audio signature.

The database 140 may contain reference audio signatures. The audio signature received from a remote user device 180 may be used to query the database 140. The reference audio signatures may be audio fingerprints. The metadata may include information identifying the origin of the audio signature, information identifying the content corresponding to the audio signature, distribution time and locations, and/or any other useful metadata.

EP 2 501 145 A2, the disclosure of which is incorporated herein, shows that the identification of the content may be utilized to serve supplemental content to a user. The result processing system 160 may, for example, be a content augmentation service.

The remote user device 180, as previously discussed, may be utilized to monitor audio information at a user location.

A device 180 may also be provided to monitor reference content and generate reference audio fingerprints and audio signatures with metadata which may be passed to the database controller 130 and stored in database 140 as a reference. The metadata may be a time stamp, an indication of the identification of the reference content or an indication of the device that captures the content. If the audio signature derived at a user device 180 matches a reference audio signature stored in the database, with an acceptable level of confidence, then the server 170 may use the metadata associated with the reference audio signature and/or associated with the captured device audio signature or derive the identification of the media content monitored by the remote user device 180.

The invention relates to a method and system for determining co-location of remote user devices 180. Remote user devices may be stationary or portable. Portable devices may include cellular telephones, tablets, laptops or other devices having computational abilities and including a microphone. Stationary devices may include computers, set top Boxes, dedicated signature generators and other devices. Often the location of a portable electronic device is indicative of the location of its owner or user. It may be useful to ascertain when more than one device is co-located and it may be useful to ascertain the identity of co-located devices, and by inference, co-located users. A stationary device may generate audio signatures at the location of the stationary device. If a portable remote user device audio signature matches the audio signature of the stationary device, the location of the portable remote user device may be inferred.

According to the invention, a portable electronic device may capture audio information which is indicative of a localized position of a device. That information may be transmitted to a server which compares the audio information with audio information received from other devices in order to determine if two or more devices are co-located.

The method, according to the invention, may determine co-location within a relatively small area based on the similarity of captured audio information. This can isolate devices to a much smaller area than location-based services such as GPS, cellular or Wi-Fi monitoring (i.e. through SSID), IP address based tracking or other indoor location tracking systems.

There are several different modes of operation. According to one mode of operation. A remote user device 180 may emit a unique or pseudo-unique audio signal. That device and other co-located devices may then capture the audio signal and the information representative of the captured audio signals may be transmitted to a server which compares available audio signals to determine co-location. According to an advantageous embodiment, the portable devices may utilize the captured audio to generate the audio signature which may be transmitted with or instead of the captured audio signal. The use of audio signatures allows a computationally more efficient comparison of information indicative of captured audio. The signature may be created by the portable device and transmitted, or may be created at a server on the basis of transmitted audio samples. According to an advantageous feature of the invention, the unique or pseudo-unique audio ID may be outside the audible range which can be normally heard by people. The device ID may be assigned to the individual device or generated on the basis of device characteristics. The device characteristics may be a signature device component's MAC address or other information associated with a particular device.

According to another embodiment of the invention, audio information which is sufficiently detailed to identify a particular location based on sound present in that location may be used to match audio information received from two or more portable devices. The use of audio signatures generated from audio information may facilitate the establishment of sufficiently unique location's specific identifying information. This may be accomplished through monitoring the ambient sound available to a particular portable device or one or more of the devices may generate a sound to facilitate identification of signals from two or more devices which are co-located. Because of slight variations in location, processing power, device characteristics and transmission characteristics, the information indicative of the audio available to a portable device may not have the same precise arrival time at a system for performing comparison of information indicative of available audio information. According to an advantageous embodiment, signals which are sufficiently similar and sufficiently close in time may be considered to be a match while still allowing for small variations in signal information and time.

According to an additional advantageous feature, location service information may be utilized to narrow the information subject to comparisons. Location information services generally can identify a broader geographic area than is necessary to determine co-location, such as devices in the same room. Location services cannot alone be utilized to identify whether devices in the same vicinity are in fact co-located. The location service information can however be utilized to limit the required comparisons and reduce the level of uniqueness required to establish a match. Location services may be based on GPS, Wi-Fi and/or cellular facilities, or in-door location tracking services.

Figure 2:
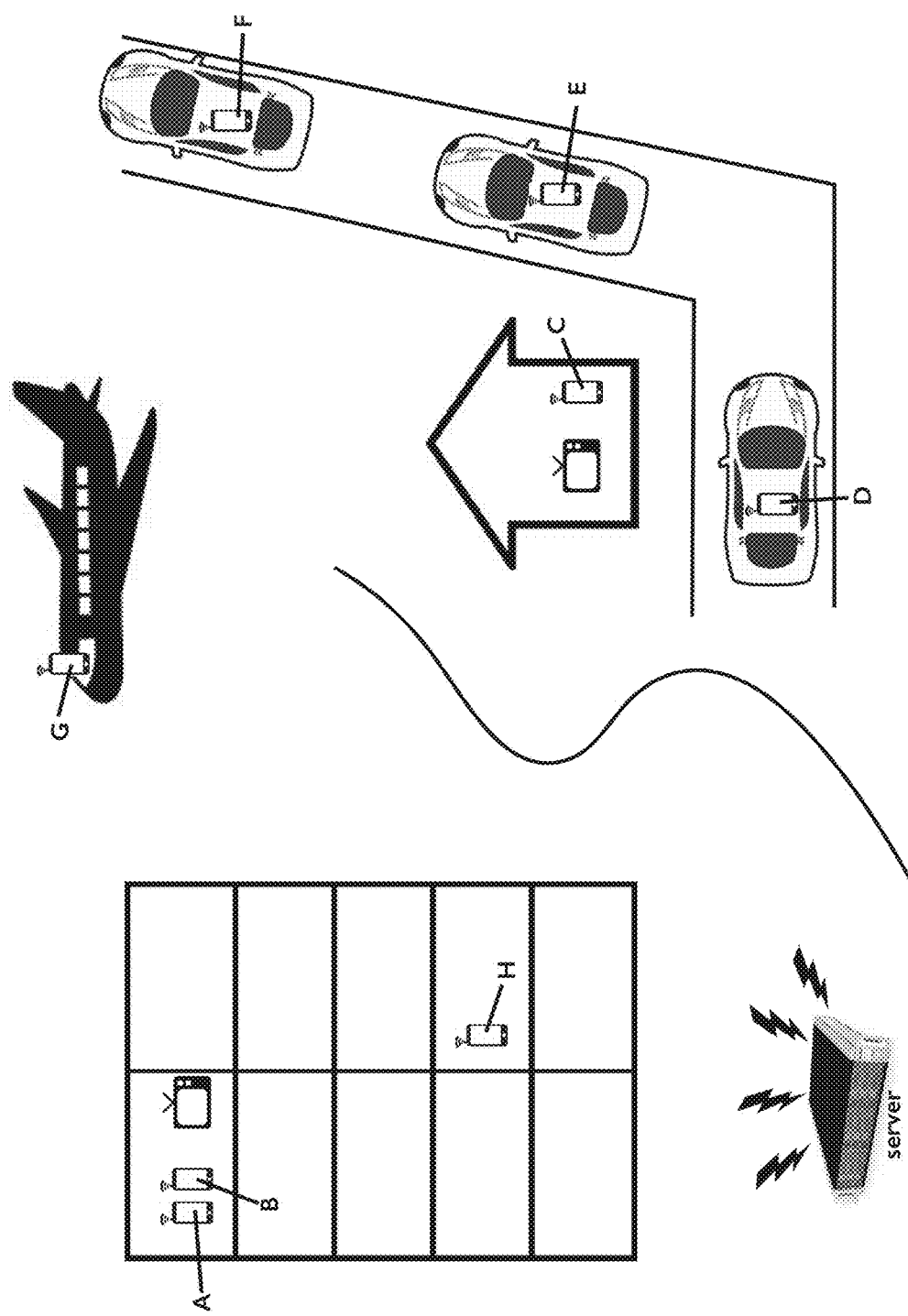
FIG. 2 schematically shows a wide geographic area having many portable devices such as cell phones.

FIG. 2 schematically shows a wide geographic area having many portable devices such as cell phones. Remote user devices A-G are shown as examples. Remote user devices A and B may be co-located in a room which may have a television. Remote user device C may be located across town in a house with a television playing the same content at the same time. Remote user devices D, E & F may be located in vehicles traveling along the interstate and remote user device G may be in an airplane. Each of the devices may capture the available audio information by sampling available audio and according to a preferred embodiment may generate an audio signature indicative of the sampled audio information. The audio signatures may each be transmitted to a server. The server may ascertain if the signatures of two or more devices are sufficiently similar to be indicative of co-location. It is the intent to be able to identify that devices A and B are located and distinguished from all other devices transmitting information.

Different ambient audio information may be available at each location. For example, Remote user device H is relatively close to Remote user devices A and B, but Remote user device H may not detect sufficiently similar audio information to be considered a match.

Remote user device C may be located in a location with the same dominant audio source as is present in the location of Remote user devices A and B. There may be other audio contributors to Remote user device C that are not making the same contribution to the audio detected by Remote user devices A and B. Different audio contributors will result in different audio signatures and may be sufficient to distinguish the audio detected in the respective locations. The same is true for Remote user devices D, E, F and G which are all subjected to the audio information present in their respective locations.

In order to reduce the complexity and number of audio signature comparisons which the server must make, it is possible to utilize location services. The location services may be useful to narrow the range of comparisons.

For example, available location services may be sufficiently broad to identify Remote user devices A, B and H as being the same location on the basis of the resolution of the location services. Similarly, Remote user devices D and E may be in the same location based on the resolution of the available location services.

In this simplified embodiment, comparison of audio signatures from 8 devices without any location-based service narrowing would require 28 comparisons (A-B; A-C; A-D; A-E; A-F; A-G; A-H; B-C; B-D; B-E; B-F; B-G; B-H; C-D; C-E; C-F; C-G; C-H; D-E; D-F; D-G; D-H; E-F; E-G; E-H; F-G; F-H; and G-H.) In this simplified example, utilizing locations services narrows the number of comparisons to 4 (A-B; A-H; B-H; and D-E.) This yields a very large computational savings may be achieved through location based narrowing.

The apparatus and method may be used to determine when two user devices are located within the same immediate vicinity. The system and method may be utilized to determine when two users are located in the same room or within a similarly close proximity. Co-location of users is inferred when their remote user devices such as cellphones or tablets are exposed to the same ambient audio information at the same time.

Figure 3:
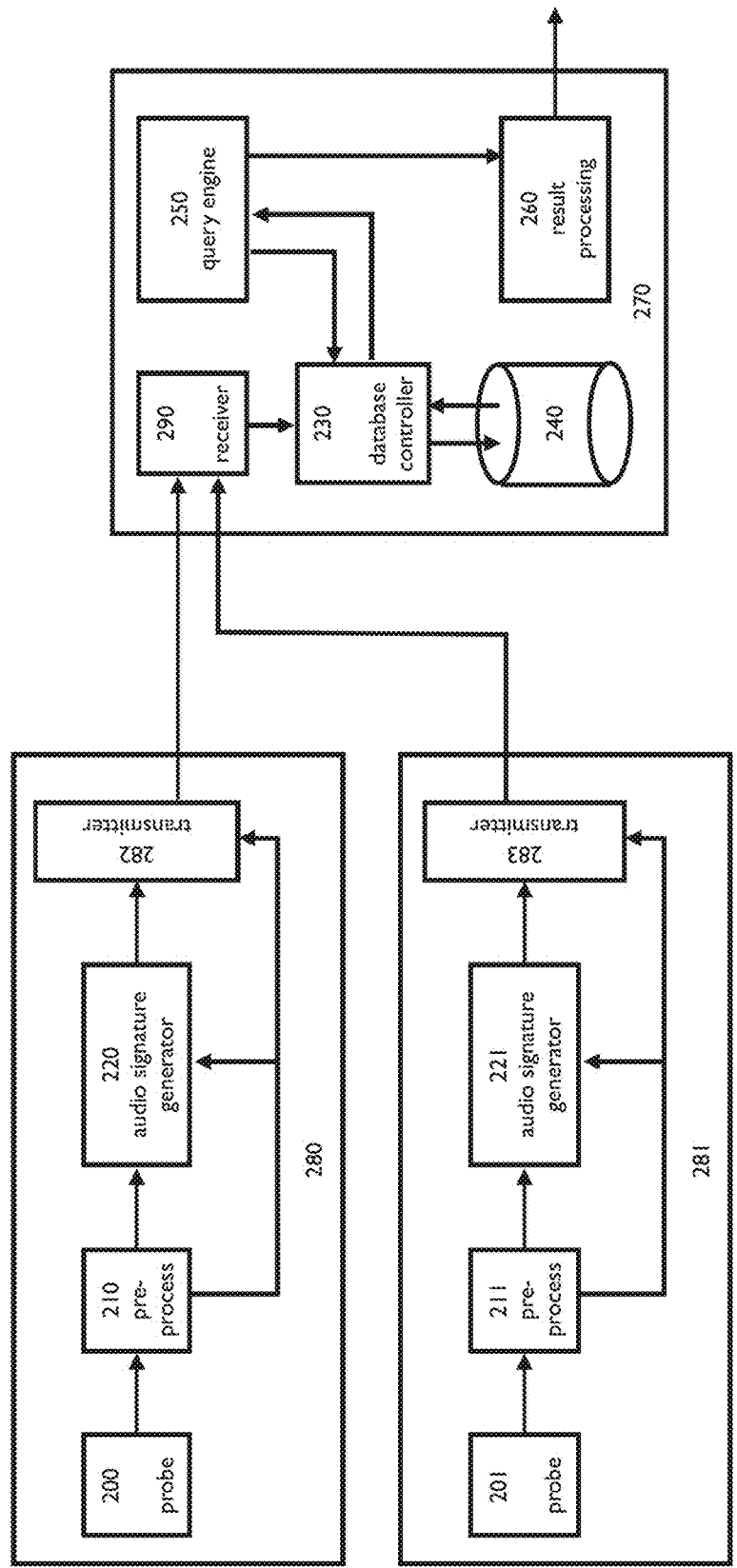
FIG. 3 shows a schematic of an embodiment of a system utilizing automatic content recognition to determine co-location of user devices.

FIG. 3 shows a system according to an embodiment of the invention. Remote user devices 280 and 281 may be devices associated with particular individual users and may be smartphones or tablets. Only two devices are shown, however it is understood that the system may receive information from many user devices. The remote user devices may each include a probe 200, 201 utilized to collect information. The probe may include a microphone in order to sample of audio. The probe may also access a clock to collect a timestamp corresponding to an audio sample and may access location services such as GPS, Wi-Fi and/or local network information or cellular location services. The timestamp and location service information is metadata for the audio sample. Other metadata accessible to the probe may also be collected.

The available location services information is generally not sufficiently localized in order to allow a conclusion that two or more remote user devices are within the same immediate vicinity or co-located. The location services information and/or timestamp may be utilized to narrow the relevant data for investigation of co-location.

The probe may be connected to preprocessing units 210, 211 which prepare the captured metadata for transmission and the captured audio for audio signature generation. The audio signatures may be fingerprints.

The preprocessing modules 210, 211 may pass the audio samples to an audio signature generation unit 220, 221 and pass the metadata to transmitter 280, 281.

A server 270 may include a receiver 290. The receiver 290 may be connected to a communications link and receive audio signatures generated at a remote user device over the communication link. In the same manner as shown in FIG. 1, the audio signatures are passed to a database controller 230 which may be responsible for storing and retrieving audio signatures from the database 240.

A query engine 250 may be provided to process the audio signatures received from one or more remote user devices against audio signatures stored in the database 240 along with the result processing unit 260. The system according to FIG. 3, may operate to store audio signatures received from remote user devices into the database and to compare audio signatures received from remote user devices 280, 281 to audio signatures already in the database in order to identify audio signatures from remote user devices which are close enough to indicate co-location of the devices.

Figure 4:
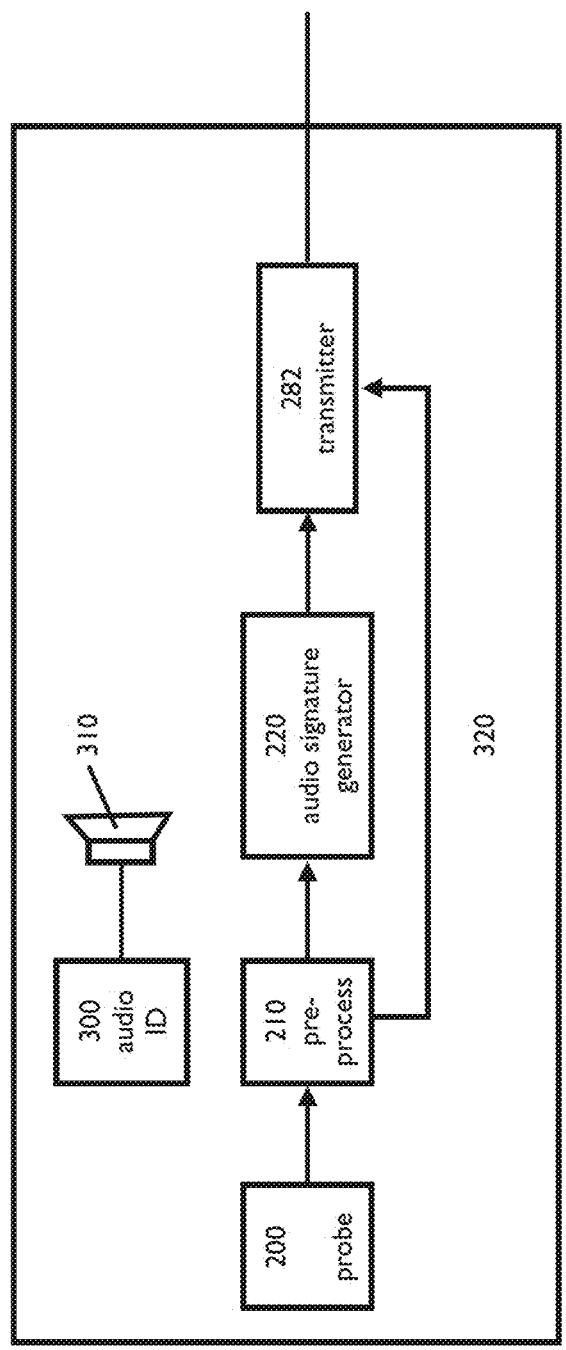
FIG. 4 shows a schematic of a remote user device having an audio generating feature.

FIG. 4 shows a schematic of components in a remote user device 320 which is particular suited for use in a system for determining co-location of remote user devices. In addition to the structure described for remote user devices 280, 281, remote user device 320 may takes advantage of an audio ID generation module 300. The audio ID generation module 300 may generate an identification signal which may be output to a speaker 310 of the remote user device 320. The audio ID may be utilized with or instead of the ambient audio being sampled by the probe. According to one embodiment, the audio ID may be a unique identification for the remote user device. The audio ID may be assigned to the remote user device or derived from characteristics, features or structure of the remote user device. For example, telephone number, MAC ID or User ID could serve as the basis for an audio ID signal.

The audio ID need not be unique and instead may be sufficient to allow the server to process signatures received from remote user devices to indicate presence of another device in the same location with a sufficient level of confidence for the system. The audio ID need only be unique enough for the server to determine, with an acceptable level of confidence, that a remote user device is present in the same vicinity as another remote user device. Advantageously the audio ID may be in a limited frequency range to ease the technical complexity of summarizing the audio.

Figure 5A:
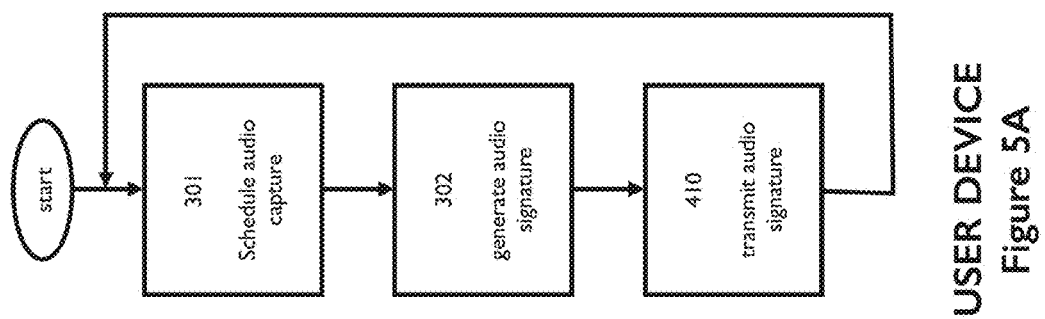
FIG. 5A shows a process flow diagram of an embodiment for determining co-location of remote user devices.

FIG. 5A shows a process that may be utilized to generate audio signatures at a remote user device. A remote user device 180 may establish a schedule to sample audio at 301. The capture may be by an audio sampling technique and the samples may be utilized to generate an audio signature at step 302. In addition, metadata may be added to the audio signature generated at step 302. The audio signature may then be transmitted to a server at step 410.

Figure 5B:
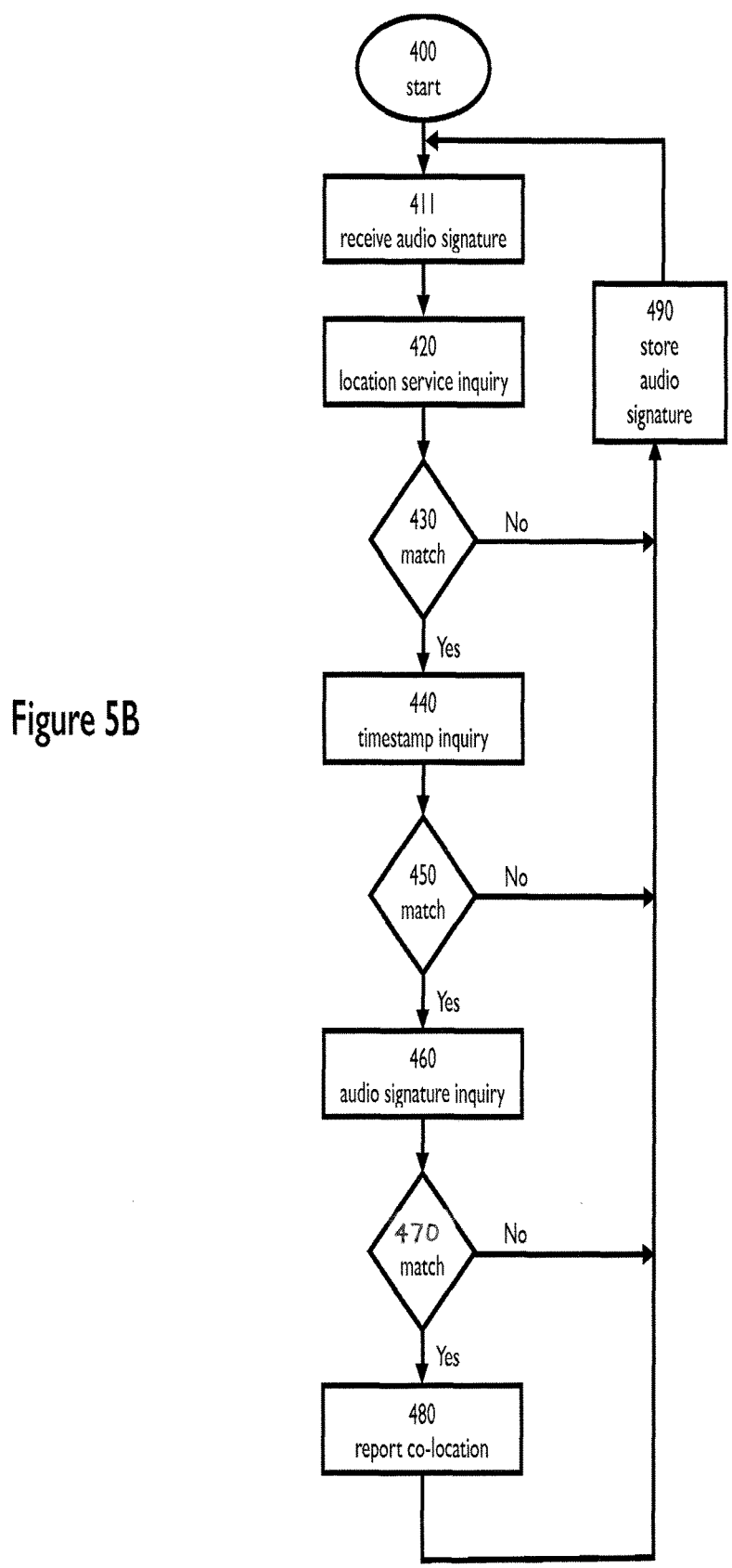
FIG. 5B shows a schematic process flow of audio signature generation and transmission by a remote user device.

FIG. 5B shows a process for determining co-location according to one embodiment of the invention. The process may have a start 400. The server is advantageously implemented in a general purpose computer but may be accomplished using special purpose hardware. An audio signature is received at step 411. The audio signature may be from a remote user device. The audio signature may be compared to signatures in the database. When a received signature is sufficiently similar to a signature already in the database, the system concludes that the remote user device associated with the received signature and the remote user device associated with the stored signature are co-located. If the received signature is not sufficiently similar to a signature already in the database, then the received signature may be added to the database for comparison with subsequently received signatures and associated with the source remote user device.

According to an advantageous embodiment, the database set of signatures utilized for comparison may be limited to signatures having timestamps which are close enough in time to the received signature to lead to a match. Alternatively, signatures that have a timestamp offset from the received signature timestamp that permit a conclusion that they do not match within an acceptable probability may be excluded from the comparison set.

According to an alternative embodiment, signatures in the database may expire or be expunged when they are sufficiently stale to be unlikely to be matched with any received signature with an acceptable level of certainty.

According to one embodiment, a location service inquiry 420 may be used to narrow the comparison set. In this embodiment, the audio signatures received and stored in the database may include metadata obtained from location services indicative of the general location of a remote user device. There is no need to query the database for fingerprint matching if the location services metadata does not indicate that the devices are within the same general location.

If the comparison set in the database does not include any signatures having the same location services information at 430, the audio signature may be added to the database at 490 for inclusion in subsequent comparison sets. If the location services information of the received signature is determined to match at 430 with one or more audio signatures in the comparison set, then the comparison set can be narrowed to include only the matching signatures.

Next, the timestamp of the received audio signature may be compared to the timestamp of audio signatures in the comparison set at 440. Any signatures in the comparison set that have timestamps outside of an acceptable range for the purpose of comparison may be excluded at 440. If the system, at 450, determines that there are no audio signatures in the comparison set that are acceptably proximal in time to the timestamp of the received audio signature, the received audio signature may be added to the database at 490 for inclusion in subsequent comparison sets.

An audio signature inquiry performed at step 460 may be more computationally-intensive than a location service query or a timestamp query. If there are no audio signatures in the reference set sufficiently similar to the received audio signatures on the basis of a signature comparison determined at 470, the received audio signature may be included in the database for use in subsequent comparison sets. If the fingerprint of a received audio signature is sufficiently close to a fingerprint contained in the comparison set, the system may conclude that the remote user device associated with the received audio signature is co-located with the remote user device associated with the matched signature in the comparison database.

Step 480 may report co-location of the respective devices. The report may then be utilized. After a report of co-location at step 480 or the storage of an unmatched audio signature in the database at 490, the process may return to the start 400 to receive the next audio signature.

According to an embodiment of the invention, the received audio signatures may be buffered or placed in temporary storage before being processed. Alternatively, the received audio signatures may be saved to the database and the system will keep track of which, or select audio signatures for use as the received audio signature in the method shown in FIG. 4 and/or to select the stored signatures to be used in a comparison set.

According an embodiment of the invention, the received and stored audio signatures may be prequalified by using only signatures which are derived from samples of specified audio content. For example, the system may be utilized to determine when two or more remote user devices are co-located during the play of a particular piece of media, for example, a commercial.)

The invention is described in detail with respect to preferred embodiments, and it will now be apparent from the foregoing to those skilled in the art that changes and modifications may be made without departing from the invention in its broader aspects, and the invention, therefore, as defined in the claims, is intended to cover all such changes and modifications that fall within the true spirit of the invention.

Thus, specific apparatus for and methods of auto-populating smart templates with data from multiple sources with structured and unstructured data have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An apparatus for generating an audio signature comprising:
    an audio signal generator configured to generate an audio signal;
    a speaker responsive to the audio signal generator that outputs the generated audio signal;
    a probe including a microphone, the probe configured to sample the generated audio signal detected by the microphone;
    an audio signature generator connected to the probe and configured to generate an audio signature from the sampled audio signal detected by the microphone, wherein the audio signature generator is configured to generate the audio signature without requiring detection of any additional audio signal; and
    a transmitter connected to the audio signature generator configured to transmit the audio signature to a communications channel.

2. An apparatus according to claim 1 wherein the audio signal generator is an audio identification signal generator.

3. An apparatus according to claim 2 wherein the audio identification signal generator generates a unique identification for the apparatus.

4. An apparatus according to claim 1 wherein the audio signal is an inaudible audio signal which is an audio identification signal.

5. An apparatus according to claim 1 wherein the audio signal generator is configured to generate an inaudible audio signal.

6. An apparatus according to claim 1 wherein the apparatus is a smartphone or a tablet.

7. An apparatus according to claim 1 wherein the probe provides a timestamp corresponding to the sampled audio signal, the timestamp being transmitted with the audio signature.

8. An apparatus according to claim 1 wherein the probe provides location data corresponding to the sampled audio signal, the location data being transmitted with the audio signature.

9. A method for generating an audio signature by a user device comprising the steps of:
    generating an audio signal;
    outputting the audio signal through a speaker of the user device;
    using a microphone of the user device to sense audio;
    generating an audio signature of the audio sensed by the microphone in the user device, wherein the audio signature is generated without requiring detection of any additional audio signal; and
    transmitting the audio signature from the user device to a communication channel.

10. A method according to claim 9 wherein the step of generating an audio signal generates an inaudible audio signal.

11. A method according to claim 9 wherein the audio signal indicative of the user device is a unique identification of the user device.

12. A method according to claim 9 wherein the user device is a smartphone or a tablet.

13. A method according to claim 9 further comprising the step of:
    providing by the user device a timestamp corresponding to the sensed audio signal, the timestamp being transmitted with the audio signature.

14. A method according to claim 9 further comprising the step of:
    providing by the user device location data corresponding to the sensed audio signal, the location data being transmitted with the audio signature.

15. A system for generating an audio signature comprising:
    (a) an apparatus including:
        (i) an audio signal generator configured to generate an audio signal,
        (ii) a speaker responsive to the audio signal generator that outputs the generated audio signal,
        (iii) a probe having a microphone, the probe configured to sample the generated audio signal detected by the microphone, and
        (iv) a transmitter connected to the probe configured to transmit the sampled audio signal to a communications channel; and
    (b) a server in communication with the communications channel configured to receive the sampled audio signal transmitted by the apparatus, the server including an audio signature generator configured to generate an audio signature from the sampled audio signal,
    wherein the audio signature generator is configured to generate the audio signature without requiring detection of any additional audio signal.

16. A system according to claim 15 wherein the audio signal generator is an audio identification signal generator.

17. A system according to claim 16 wherein the audio identification signal generator generates a unique identification for the apparatus.

18. A system according to claim 15 wherein the audio signal is an inaudible audio signal which is an audio identification signal.

19. A system according to claim 15 wherein the audio signal generator is configured to generate an inaudible audio signal.

20. A system according to claim 15 wherein the apparatus is a smartphone or a tablet.

21. A system according to claim 15 wherein the probe provides a timestamp corresponding to the sampled audio signal, the timestamp being transmitted to the server with the sampled audio signal.

22. A system according to claim 15 wherein the probe provides location data corresponding to the sampled audio signal, the location data being transmitted to the server with the sampled audio signal.

23. A method for generating an audio signature comprising the steps of:
    generating an audio signal by a user device;
    outputting the audio signal through a speaker of the user device;

using a microphone of the user device to sense audio;

transmitting the sensed audio from the user device to a communication channel;

receiving the transmitted sensed audio at a server remote from the user device that is in communication with the communication channel; and generating by the server an audio signature of the sensed audio received at the server, wherein the audio signature is generated without requiring detection of any additional audio signal.

24. A method according to claim 23 wherein the step of generating an audio signal generates an inaudible audio signal.

25. A method according to claim 23 wherein the audio signal indicative of the user device is a unique identification of the user device.

26. A method according to claim 23 wherein the user device is a smartphone or a tablet.

27. A method according to claim 23 further comprising the step of:

providing by the user device a timestamp corresponding to the sensed audio signal, the timestamp being transmitted to the server with the sensed audio.

28. A method according to claim 23 further comprising the step of:

providing by the user device location data corresponding to the sensed audio signal, the location data being transmitted to the server with the sensed audio.

\* \* \* \* \*